United States Patent

Larsen

[11] 4,028,894
[45] June 14, 1975

[54] APPARATUS FOR PREVENTING EROSION OF THE SEABED IN FRONT OF HYDRAULIC STRUCTURES

[76] Inventor: Ole Fjord Larsen, 62-Fasanvaengent P.O. Box 604 DK 6700, Esbjerg, Denmark

[22] Filed: Aug. 14, 1975

[21] Appl. No.: 604,837

[52] U.S. Cl. .................................................. 61/3
[51] Int. Cl.² .......................................... E02B 3/04
[58] Field of Search .................. 61/2, 3, 4; 1 R, 46

[56] References Cited
UNITED STATES PATENTS

| | | | |
|---|---|---|---|
| 2,069,715 | 2/1937 | Arpin | 61/4 |
| 3,490,239 | 1/1970 | Vincent | 61/4 |
| 3,529,427 | 9/1970 | Titman | 61/1 R |
| 3,830,066 | 8/1974 | Larsen | 61/3 |
| 3,844,123 | 10/1974 | Larsen | 61/3 |
| 3,844,125 | 10/1974 | Williams, Sr. | 61/3 |

OTHER PUBLICATIONS

"Seditech," a trade publication available from Seditech Co., P.O. Box 604, 6700 Bsbjerg, Denmark, Feb. 26, 1973.

*Primary Examiner*—Paul R. Gilliam
*Assistant Examiner*—Alex Grosz
*Attorney, Agent, or Firm*—Diller, Brown, Ramik & Wight

[57] ABSTRACT

This invention relates to a device which deposits and protects sediment on the floor of bodies of water. An elongate thin sheet, including two longitudinally extending side portions which diverge away from each other toward the floor of the body of water, at an angle between 1:2–1:5 in relation to the horizontal, and means to maintain the sheet side portions in this position. Additional means are spaced along said sheet to anchor them to the floor of the body of water, and the device may include perforated sections.

7 Claims, 32 Drawing Figures

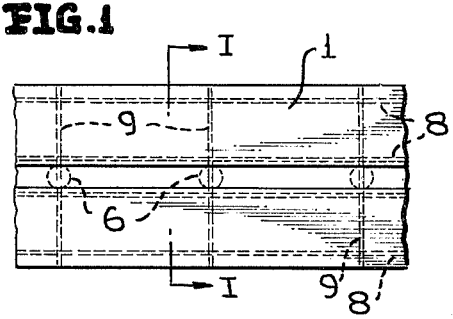
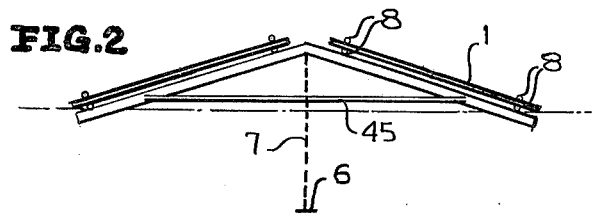
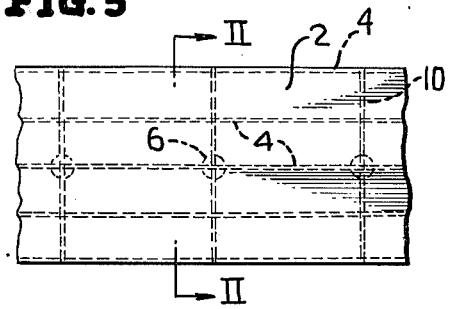
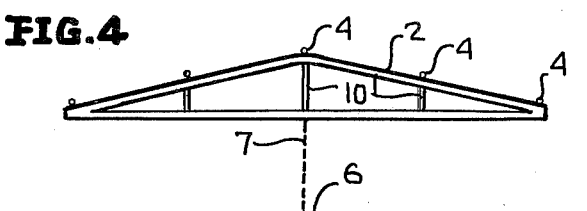
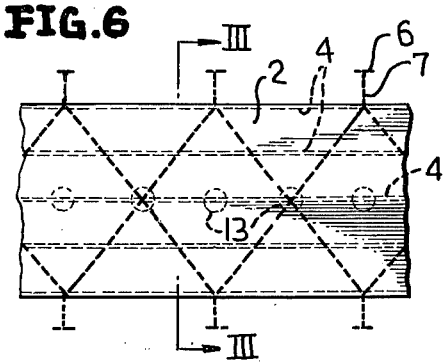
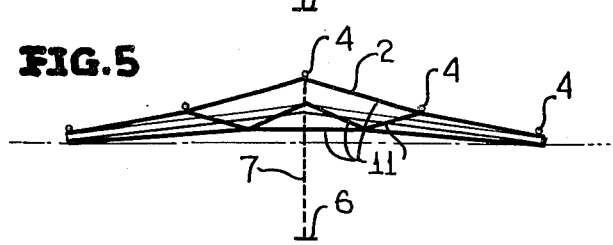
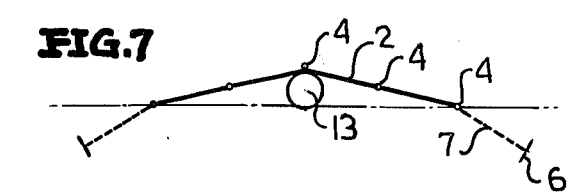
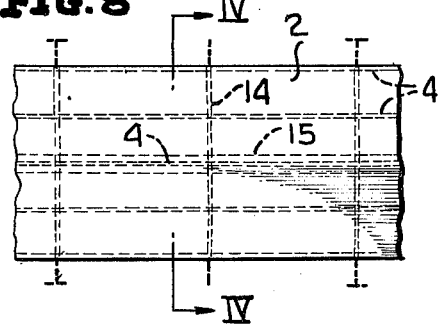
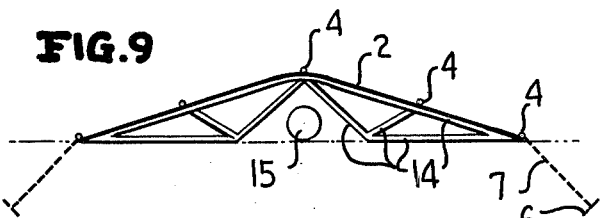
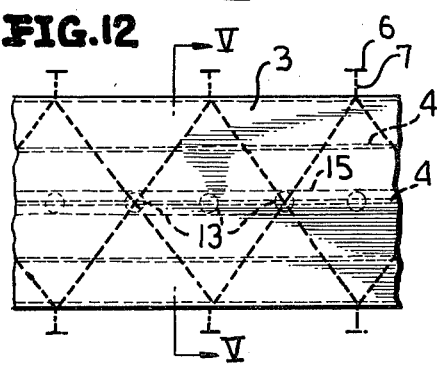
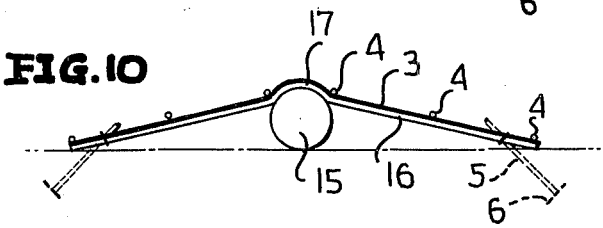
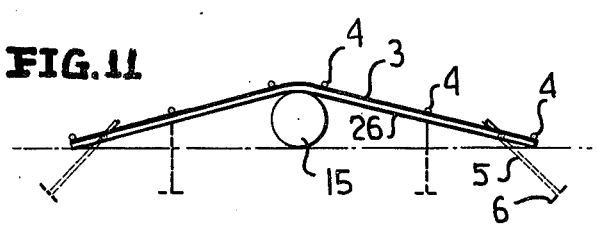
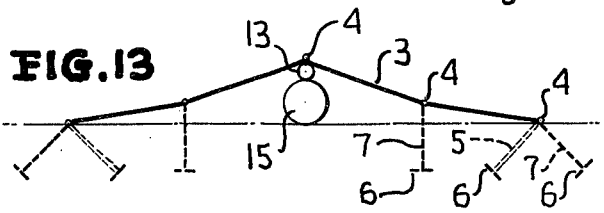

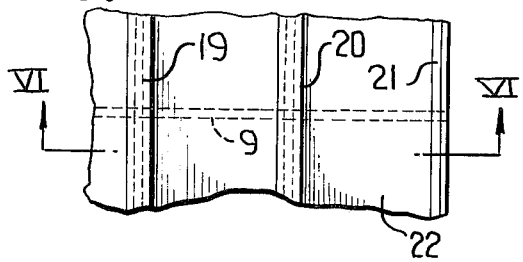
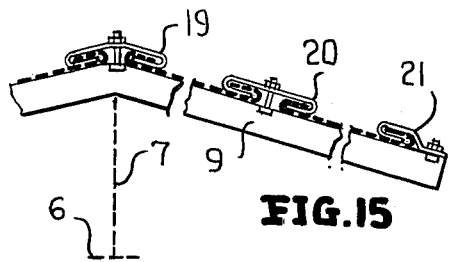
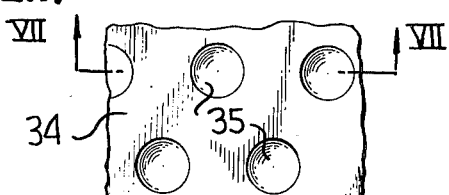
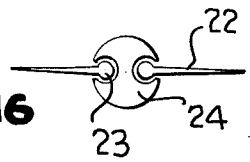
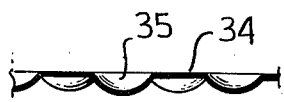
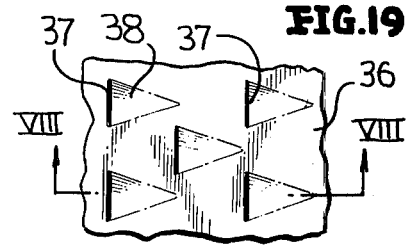
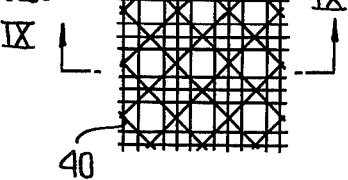
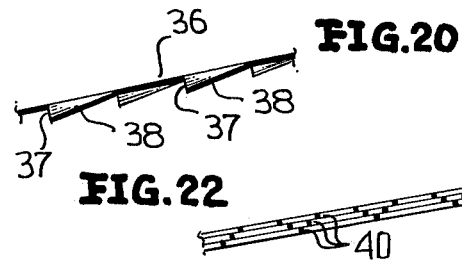
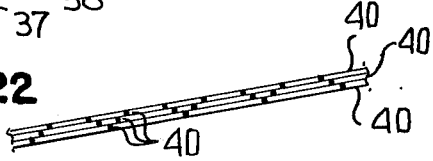
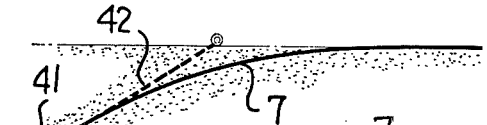
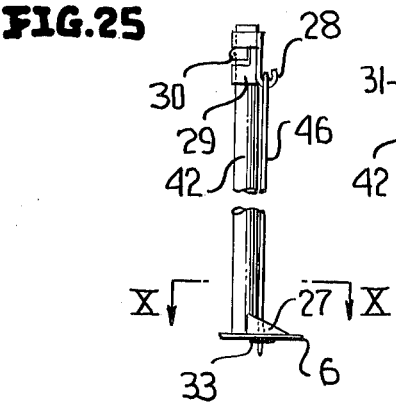
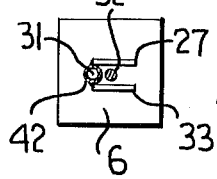
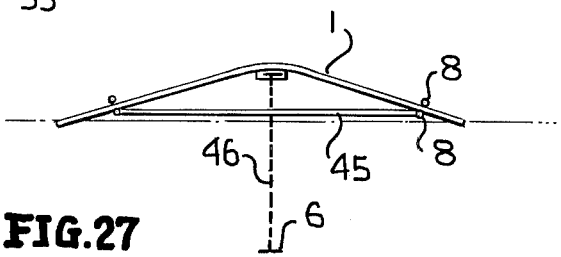

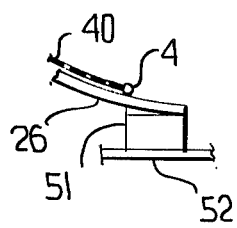
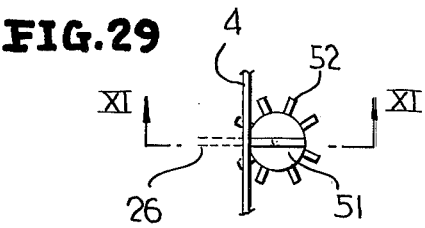
FIG. 30
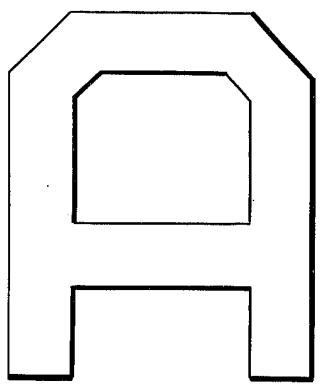
FIG. 31
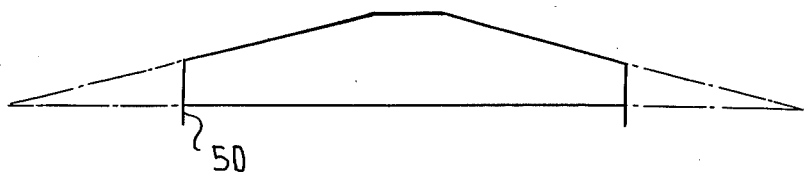
FIG. 32
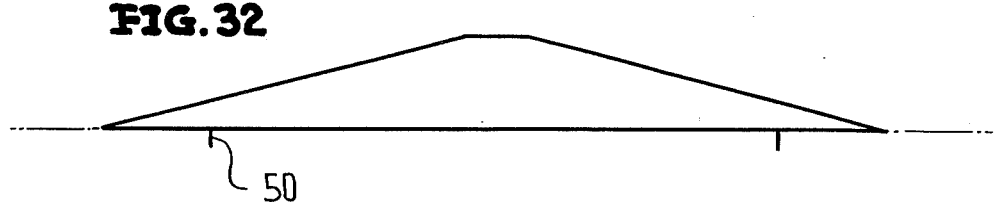

APPARATUS FOR PREVENTING EROSION OF THE SEABED IN FRONT OF HYDRAULIC STRUCTURES

The invention relates to a device for depositing and protecting and and other littoral drift material on the floor of a sea, lake, river or other bodies of water.

Various kinds of barriers exist or have been proposed in the form of groins, brekwaters, etc. but all of them are so deficient technically or aesthetically, and/or so expensive that coastal protection on a sufficiently large scale so far has been out of the question.

The device or devices of this disclosure combines technical perfection with very low cost, allowing for large scale coastal protection. By placing the device with its longitudinal direction perpendicular to the coast, an effect comparable with that of a natural submarine reef is obtained. The streamlined cross-section, the flat slopes and the possible properly proportioned apertures of the roofridge-formed sheet make up a device that traps the drifting sedimentary material underneath the sheet and protects it from scouring. Thereafter deposition of sediment of top and along both sides of the device gradually builds up a shoal extending far away from the device in all directions.

Like natural reefs this shoal refracts the waves and spreads their energy, so that this self-amplifying effect results in further build up of the shoal, until a new stable state of equilibrium of the upstream side of the coast has been reached.

Besides for coastal protection the device may be used for other purposes, e.g. prevention of siltation in navigable channels and in harbour mouths. In such case the device is placed along the channel or the harbour mouth on its both sides, thereby forming a hindrance for passage of the drifting material.

For a certain desired depth of water in the fairway a selfdredging effect can be obtained by spacing the two carriers properly. The refraction of the waves toward the channel due to the slope causes the masses of the refracted and breaking waves to pile up in and consequently an outward current through the channel.

Normally the height of the device must be little compared with the depth of water. A deposition higher than the device may be achieved by disposing successively other devices on top of the depositions caused by the previously disposed devices, until the desired height of the shoal has been achieved. A shoal with horizontal surface may form between interspaced devices of the same level.

Being completely submerged this device does not disfigure the coast, opposite the traditional groins, breakwaters, etc.

Another important field of application is protection from undermining of rather low, lengthy submarine structures such as pipelines, cables, foundations and the like. In this case the device is placed on top of the structure to be secured and thereby causes an accumulation of sediment along both sides of the structure. Until the sedimentation has taken place the anchoring means of the device prevents migration of the structure.

The description will be illustrated by reference to the drawings in which:

FIG. 1 is a plan view of corrugated plates 1 assembled by longitudinal shapes 8 an supported on angled shapes 9 and anchored to disks 6 through anchoring ropes 7;

FIG. 2 is a cross-section taken along the line I—I of FIG. 1;

FIG. 3 is a plan view of a perforated sheet 2 assembled by longitudinal shapes 4 and supported on lattice trusses 10 and anchored to disks 6 through anchoring ropes 7;

FIG. 4 is a cross-section taken along the line II —II of FIG. 3;

FIG. 5 is a cross-section of a perforated sheet 2 assembled by longitudinal shapes 4 and supported on rope forming a lacing 11 stretched by three struts 12 in hinged interconnection in one point at the middle;

FIG. 6 is a plan view of a perforated sheet 2 assembled by longitudinal shapes 4 and reinforced by zig-zag wire ropes 18 and supported on inflatable spheres 13 and anchored and stretched by disks 6 through anchoring ropes 7;

FIG. 7 is a cross-section taken along the line III —III of FIG. 6;

FIG. 8 is a plan view of a perforated sheet 2 assembled by longitudinal shapes 4 and supported on lattice trusses 14 comsisting of two symmetrical halves which are interconnected at a point above the pipeline or other horizontal structure 15 which is to be protected from scour;

FIG. 9 is a cross-section taken along the line IV —IV of FIG. 8;

FIG. 10 is a cross-section of two symmetrical halves of impermeable sheets 3 supported by longitudinal shapes 4 one beams 16 which may be supported and anchored by disks 6 through vertical poles 5 and are attached to the pipeline 15 by clamps 17;

FIG. 11 is a cross-section of an impermeable sheet 3 containing apertures along its ridge and supported by longitudinal shapes 4 on pairs of shapes 26 that are in mutually hinged connection over the top of the structure 15 which is to be protected; the outer ends of 26 being supported on and anchored by poles 5 mounted on disks 6;

FIG. 12 is a plan view of a impermeable sheet 3 containing apertures 25 at the ridge and assembled by longitudinal shapes 4 and reinforced by zig-zag wire ropes 18 and supported on the pipeline 15 via inflatable spheres 13 and anchored by disks 6 through anchoring ropes 7 and poles 5, and stretched and prevented from flapping up and down by disks 6 through ropes 7;

FIG. 13 is a cross-section taken along the line V—V of FIG. 12;

FIG. 14 is a plan view of a perforated sheet of rather rigid material 22 assembled by bending the edges of each width around special shapes 19, 20 or 21 and supported on angled shapes 9 and anchored by disks 6 through anchoring ropes 7;

FIG. 15 is a large-scale cross-section taken along the line VI—V1 of FIG. 14;

FIG. 16 is a large-scale cross-section of a sheet of rather rigid material 22 of which the edges of each width are supplied with a bead 23 fitting into the grooves in two opposite sides of the special shape 24;

FIG. 17 is a plan view of a segment of a sheet 34 shaped to form conical channels 35;

FIG. 18 is a cross-section taken along the line VII-—VII of FIG. 17;

FIG. 19 is a plan view of a segment of a sheet 36 containing slits 37 and folds 38;

FIG. 20 is a cross-section taken along the line VIII-—VIII of FIG. 19;

FIG. 21 is a plan view of a segment of a sheet consisting of several layers of mesh 40;

FIG. 22 is a cross-section taken along the line IX—IX of FIG. 21;

FIG. 23 is a vertical cross-section of a auger-formed disk 41 screwed into the ground by means of a detachable rod 42, the anchoring rope 7 in this case being fastened directly on to the disk 41;

FIG. 24 is a side view of an anchoring disk 41, the center rod 43 of which the anchoring rope 7 is fastened via a rotating reaction ring 44;

FIG. 25 is a side view of a pipe 42 for conducting a water jet through the hole 31 of the disk 6 which is being pressed against the lower end of 42 and its two feet 27 by means of a neoprene ring 46, which has been put through the hole 32 of the disk 6, retained by a crosspiece 33, stretched and thereafter suspended from the hook 28 mounted on the clamp 29, the clamp 29 in this case being supported by the nut 30 fittng into screw thread on the outer surface of 42 allows for lowering of 29 after the positioning of 6, so that the upper end of 46 can be moved from 28 to the device to be anchored, and 42 be removed;

FIG. 26 is a cross-section taken along the line X—X of FIG. 25;

FIG. 27 is a cross-section of a preferred embodiment consisting of a corrugated plate 1 with rounded and perforated ridge and stiffened by longitudinal shapes 8 and by ties 45 and anchored by disks 6 through stretched neoprene anchoring ropes 46;

FIG. 28 is a cross-section taken along the line XI—XI of FIG. 29;

FIG. 29 is a plan view of an open box-type anchor 51 supplied with horizontal bars 52;

FIG. 30 is a plan view of the base of a special type of drilling rig; and

FIGS. 31 and 32 are alternative cross-sections.

The ridge formed by the meeting of the two sheet side portions should be rounded (FIGS. 4, 9, 25). The two sheet side portions should not be too steep. To obtain the desired depositing effect and to prevent too heavy strain of the sheet, the sheet side portions should not be steeper than about 1:4 – 1:3. The angle of slope may decrease gradually from the middle toward the edges of the device, of. FIG. 13, to prevent local scour at the edges.

The sheet may be made of more or less flexible material. Rigid materials such as, glassfiber-reinforced polyester, aluminium, sheet iron or polyethylene are appropriate where the vertical component of the water motion is significant. To increase the stiffness and strength, the sheet may be corrugated (FIGS. 1–2). The waves of the corrugated sheet may be parallel with or perpendicular to the longitudinal direction of the device. In the latter case the strength of the sheet may allow for spanning it from edge to edge, only strengthened by horizontal ties 45. To avoid creation of turbulence the surface of the upper part of the sheet should be even, without corrugation.

Suitable flexible materials are polyethylene, polyester, nylon, etc., or natural fibre such as jute, sisal, etc.

Depending on the purpose of the device and the prevailing conditions the sheet may be impermeable, only provided with apertures located at the top of the ridge (FIGS. 1–2, 10, 27), or a part of or all of the surface of the sheet may be perforated evenly or differentially.

The sheet may consist of two or more separate layers of perforated material. If the percentage area of the apertures is rather small, the upward flow through the apertures at the leeside of the device hereby can be increased. In this case th upper layer(s) sould be very flexible and a little larger than the lower layer and be fastened to this in certain points only, so that it can rise a little distance above the lower layer for upward flow. If, on the other hand, the sheet consists of open net material as shown in FIGS. 21-22, so that it cannot retain the particles of the sediment, the extra, larger layer(s) of net should be attached at certain points to the underside of the upper, stretched layer of net, and preferably be made of buoyant material. The upward flow will press the lower layer(s) against the upper layer, whereby the sediment will be prevented from passing through the nets.

The same effect as with such extra layers of net can be achieved by a sheet consisting of open net that is supplied on its upper - respectively underside with strips of buoyant, flexible material attached by one end to the surface.

The advantage of an open net structure is that it requires only little anchoring. FIGS. 28–29 show an anchor to be fixed to the lower ends of the cross-girders 9, 10, 14, 16 or 26, or to the edges of the sheet. It consists only of a flat, circular or edged box 51 which is open at its upper end so that it will be filled with the drifting sediment. Level with its bottom its periphery may be supplied with horizontal bars 52 to resist upheaval through the bed sediment, when the box has been undermined and sunk by the waves and currents, after having been placed on the bed.

To prevent the local scour under the edges of the device, the percentage area of the perforation may increase gradually from the ridge toward the edges of the device. In practice such gradual differentiation may be replaced by joining several layers of perforated sheets together and steeping down the number of layers toward the edges.

In particular in devices for protection of submarine structures an opening along the ridge (FIGS. 1–2, 10–11) may be the only aperture of the device. It may be obtained by spacing the interconnected two sheet side portions apart (FIGS. 1–2, 10–11).

To prevent the coarser part of the sediment from becoming conducted up through the apertures, these may be covered with strainers made, for instance, of nylon mesh.

With the aims of increasing the rate of deposition of sediment and of preventing overloading of the device due to the impact of waves or due to deposition of sediment on top of the device, the sheet may be formed in special ways:

The apertures may be provided with sheltering pockets 38 (FIGS. 19–20) which prevent the current above the device from passing down through the apertures 37, but allow for falling down of sediment deposited on the device. The pocket 38, made of flexible or stiff material, may be attached to the surface of the device or be formed in the sheet itself by slitting and folding it up like the raised teeth of a shredder (FIGS. 19–20), if necessary stiffened by attached forms. The pockets may be placed on the top side and/or the underside of the sheet.

In some cases the task is, on the contrary, to accumulate a load of sediment on the device in order to keep the edges of the device tight to the floor. This may be obtained by means of pockets attached to the device, without perforation underneath the pockets.

The sheet may be shaped to form conical channels 35 with upwardly decreasing cross-section area (FIGS. 17–18) or the sheet may have a grid structure with vertical and/or slanting sidewalls.

The build up underneath the device may be accelerated by a successive regulation of the effective flow area of the perforation. For example, in a device as shown in FIGS. 10, 11 or 13, it may be appropriate to start with a comparatively large flow area at the top of the device, allowing for a filling up of the hollow underneath the device within a minimum of time. When the hollow is almost filled, part of the apertures can be closed - e.g. by means of strips of flexible or stiff material attachable to the surface of the sheet - so that the deposition thereafter can grow all the way up to the underside of the sheet.

The join of the widths of material making up a flexible sheet may be made in several ways. In cases of staying of the sheet by means of rigid longitudinal and/or cross-stays 4 for prevention of flapping up and down of the sheet, the stays may be placed in casings made in the sheet material (FIGS. 9–13), or they may be formed as assembling bars 4 joining neighbouring widths together (FIGS. 9–13). For this purpose two opposite sides of each stay 24 (FIG. 16) may contain a groove which embraces the bended edge or a bead molded in the edge of the width of sheet material, or the stay may consist of a bar on both sides of the overlap of the two neighbouring widths, the widths being pressed together by bolts or nails assembling the two bars through the overlap, or the cross-section of the stay may be formed as shown in FIGS. 14–15, so as to assemble the neighbouring widths by bending the edges of these 180° around the two sides of the shape. The shapes may be formed to be placed at the ridge 19, at the lower edges 21 or in between 20.

The sheet may be supported in numerous ways:

Its ridge may be supported on vertical poles drive, water-jetted, screwed or vibrated into the ground. Each pole may be mounted on a horizontal disk to increase the supporting area and possibly serve as anchor. In case of water-jetting, the pole consists of a pipe, and the disk is perforated at its center, so that the water can be jetted through the pipe in case of screwing, the disk is shaped an an auger with one turn.

A flexible sheet 2 as shown in FIGS. 6–7, may be supported at its middle by inflatable spheres 13 or by a continuous inflatable hose, allowing for a convenient way of installing the device and maintain a perfect stretching of the sheet under all conditions.

Devices protecting submarine structures such as pipelines, cables, foundations, etc., may be supported directly on the sttructure (FIGS. 10–11) or via spheres 13 (FIGS. 12–13) or via a continuous hose.

The sheet side portions may be supported on lattice girders (FIGS. 3–4, 9) made of such materials as steel, aluminium or glassfiber-reinforced polyester. A special design is shown in FIG. 5. The three points of a skeleton consisting of three rigid members 12 are connected by a steel wire rope 11 on which the sheet is supported. By the use of rope instead of rigid members, bending forces are avoided.

In devices protecting submarine structures (FIGS. 9–13) the girders may consist of two symmetrical halves supported at the middle of the structure (FIGS. 10–11) or on each other a distance above the structure (FIG. 9).

Where the forces exerted by the water on the sheet are not very strong, the lattice girders may be replaced by beams 16, 26 (FIGS. 10–11). Where the vertical motions of the water are ignorable, e.g. at great depths of water, no support under the sheet side portions may be required (FIGS. 6–7, 12–13).

To prevent any flapping up and down of the sheet, tethering 7 (FIG. 12) of intermediate points of the sheet may be necessary.

The anchoring of the device at its edges (FIGS. 6–7, 12–13) or at its middle (FIGS. 1–5, 15, 27) may be done by disks 6 that are water-jetted or screwed into the ground. They may be connected with the device by means of rope 7 (FIGS. 2, 4, 5, 15) or by poles 5 as described above, in cases where a support of the edges of the device is required, e.g. because of an initial local scour at the edges. The rope 7 appropriately is connected to the screw-anchor 41 (FIG, 24) through a rotating reaction ring 44.

To keep the edges of the devices shown in FIGS. 1–5, 15, 27 tight to the floor under all conditions, so that the currents cannot get underneath the edges and remove the device, the rope 7 should include elastic parts 46 (FIGS. 25–27), e.g. neoprene, which are stretched sufficiently to absorb under steady tensioning any possible settlement of the device. Preferably the elastic element 46 fastened at its lower end to the disk 6 should be placed and stretched by means of, possible inside, the detachable pipe 42 for waterjetting or screwing the disk 6 into the ground. After positioning of the disk 6 the upper grip of the elastic element 46 is transferred from the pipe 42 to the device, and the pipe is removed.

To minimize the expensive underwater work the devices should be prefabricated, so that only the anchoring has to be done by divers.

Devices as shown in FIGS. 1–5, 14–15, 27 may be assembled in complete sections on the beach and thereafter rolled, e.g. on inflatable plastic rollers, and floated on the rollers to the site where the device is to be installed. Here the rollers are detached, and the section sinks to the bottom where it is anchored.

Besides accumulation of sediment around a submarine structure the object of a device often is to prevent ships' anchors, dragnets, etc., from catching hold of and damaging the structure. In such case the device may include a resistable supporting system of cross-beams 26 (FIG. 11) anchored in the bottom and a covering sheet 3 that is fastened so weakly to these beams that it will be removed from its fastening points by any anchor or dragnet and slide on top of the cross-beams, thereby carrying the anchor or the dragnet over the top of the structure 15. In FIG. 11 the sheet is supported and possibly assembled by means of stays 4 resting on the cross-beams 26. The stays 4 therefore must have sufficient strength to carry the weight of a ship's anchor. The fastenings between the stays 4 and the cross-beams 26 must be weaker than the holding capacity of the disk 6 anchoring the cross-beams. If a ship's anchor or dragnet comes perpendicular to the structure and hits the end of a cross-beam, and the holding capacity of the disk 6 is exceeded, the cross-beam will turn around the anchoring point on the opposite side, thereby lifting the ship's anchor or dragnet over the structure 15. In all cases the damage to the structure 15 will be prevented. But the section of the device that has prevented the damage will have to be repaired afterwards.

A special kind of offshore structure to be protected from undermining is the A-formed foundation of a certain type of oil drilling rig as shown in FIG. 30. An appropriate device in this case includes detachable sections of rigid material, e.g. steel. They may be hinged to the edges of the foundation, so that they can rest on top of this during the transport of the platform to a new location, and be swung down again on the seabed when the foundation has reached the seafloor. To obtain the most favourable configuration of the whole, the foundation itself should be formed with a cross-section as shown in FIG. 31 or 32 to prevent any undermining. A vertical skirt 50 penetrating the seabed along the edges of the foundation helps prevent flow along the underside of the structure.

The embodiments of the invention in which an exclusive property or privilege is claimed are defined as follows:

1. A device for producing and protecting deposits of sedimentary material on the floor of a body of water and specifically preventing the undermining of an elongated marine structure, said device including at least a single longitudinally extending sheet, said single longitudinally extending sheet being composed of at least two layers of perforate material, means joining said layers together at selected points, and said single longitudinally extending sheet having first and second opposite longitudinally extending side portions, a first of said longitudinally extending side portions being contiguous of said elongated marine structure remote from said floor, a second of said longitudinally extending side portions being contiguous of said elongated marine structure adjacent said floor, said sheet diverging in a direction toward said floor away from said elongated marine structure at an angle to said floor of between generally 10–30 degrees, means for maintaining said side portion so positioned relative to said floor, and an uppermost of said layers being taut relative to a looser lowermost of said layers whereby relative upward movement of the lowermost layer toward the uppermost layer is permitted.

2. The device as defined in claim 1 wherein said maintaining means include a plurality of beams tranversely underlying spanningly supporting said sheet along longitudinally spaced points thereof, and means spaced longitudinally along said sheet for anchoring the same to said floor.

3. The device as defined in claim 2 wherein the number of said layers varies over the surface of said sheet.

4. The device as defined in claim 2 wherein the number of said layers gradually decreases from an uppermost longitudinal edge of said sheet toward a lowermost longitudinal edge of said sheet.

5. The device as defined in claim 1 wherein the number of said layers varies over the surface of said sheet.

6. The device as defined in claim 1 wherein the number of said layers gradually decreases from an uppermost longitudinal edge of said sheet toward a lowermost longitudinal edge of said sheet.

7. The device as defined in claim 1 wherein the perforations of said layers is defined by constructing said layers from mesh material.

* * * * *